Patented Oct. 29, 1935

2,019,225

UNITED STATES PATENT OFFICE 2,019,225

MANUFACTURE OF FIBROIN SOLUTIONS

Emil Hubert, Dessau in Anhalt, Wilhelm Irion, Bobingen, and Herbert Mahn, Dessau in Anhalt, Germany, assignors to I. G. Farbenindustrie Aktiengesellschaft, Frankfort-on-the-Main, Germany No Drawing. Application October 24, 1932, Serial No. 639,384. In Germany October 24, 1931

5 Claims. (Cl. 134—1)

Our present relation relates to the preparation of fibroin solutions.

One of its objects is the process of preparing solutions of fibroin in aqueous solutions of mixtures of hydrated salts.

Other objects are the resultant solutions of fibroin in aqueous solutions of mixtures of hydrated salts.

Further objects will be apparent from the detailed specification following hereafter.

In the production of solutions of fibroin in solutions of hydrated salts it is desirable that the amount of salt shall be as small as possible. Furthermore, in order to prevent the fibroin from being degraded by heat it is necessary to avoid raised temperatures.

According to this invention a solution of fibroin is easily obtained at a low temperature and with a small amount of salt by using as a solvent, instead of an aqueous solution of a single hydrated salt, an aqueous solution containing a mixture of two or more hydrated salts.

By causing a saturated aqueous solution of sodium thiocyanate to act at 20° C. upon natural silk, the latter is neither dissolved nor swollen to form a water-soluble compound. If fibroin is to be dissolved with the aid of sodium thiocyanate, it is necessary to use a saturated aqueous solution of sodium thiocyanate of at least 45° C. The dissolution of natural silk in a solution of magnesium thiocyanate, saturated at ordinary temperature, leads to a similar result. In order to dissolve silk by means of magnesium thiocyanate, it is even necessary to use a saturated aqueous solution at a temperature of between 80° C. and 100° C.

It is therefore surprising that natural silk can be completely dissolved or can be swollen to produce a water-soluble paste with the aid of sodium thiocyanate or magnesium thiocyanate even at room temperature, that means at about 25° C., by using an aqueous solution which contains, besides sodium thiocyanate or magnesium thiocyanate, at least one other hydrated salt, for instance, barium thiocyanate or lithium thiocyanate, or which contains both sodium thiocyanate and magnesium thiocyanate. This effect of the mixed salt solutions is obtained not only on addition of a relatively small amount of a hydrated salt, by the aid of which silk may be dissolved even at a low temperature, for instance lithium thiocyanate or barium thiocyanate, to a salt by means of which silk is dissolved only at a raised temperature and in a higher concentration, for instance sodium thiocyanate, but also by the aid of suitable mixtures of salts, which, when applied separately, dissolve silk only when they are used in a solution of a higher concentration and at a raised temperature, for instance magnesium thiocyanate and sodium thiocyanate, or sodium thiocyanate and manganese thiocyanate, or sodium thiocyanate and zinc thiocyanate. The aqueous solutions of the hydrated salts employed need not be saturated.

When aqueous solutions of two or more hydrated salts are used for dissolving fibroin, the favourable action produced by the addition of acid amides as described in the co-pending application Serial Number 593,196, filed February 15, 1932 by Mahn et al is likewise obtained.

In practice the process may be carried out by introducing the silk into the aqueous solution containing two or more hydrated salts and allowing the whole to stand, or by causing the silk to swell in a solution of one of the salts and then adding the other component or components. In this process the quantities of the different salts need not be in a determined molecular proportion, although it may be advantageous to start from salt solutions obtained by dissolving well defined double salts, the double salt alone being sufficiently effective to obtain the result described. Whether the dissolving effect observed is to be attributed to the formation of double salts in the salt solution having an increased capacity of dissolving fibroin, is of no importance for the invention.

In the above description the term "hydrated", is equivalent to "hydrating".

The following examples illustrate the invention:

1. Into a solution consisting of 5 parts by volume of a 57% solution of NaSCN and 5 parts by volume of a 42% solution of Mg(SCN)$_2$ there is introduced 1 part by weight of degummed natural silk. After standing for 20 hours at room temperature (about 25°) dissolution is complete.

The solutions of sodium thiocyanate or magnesium thiocyanate show quite a different behaviour if each of these salts is applied separately. For instance, it is not possible to dissolve at ordinary temperature 1 gram of degummed natural silk in 10 cc. of a 57% solution of sodium thiocyanate or in 10 cc. of a solution of Mg(SCN)$_2$ of 42% strength; dissolution does not occur even at 50° C.; nor is the silk converted into a water-soluble paste.

2. In 5 parts by volume of a solution of NaSCN saturated at room temperature, 1 part by weight of silk wastes is swollen up for 2 to 3 hours, and 5 parts by volume of a solution of Mg(SCN)$_2$ saturated at room temperature are then added. The swollen jelly is thereby partly dissolved and partly transformed into a soluble paste. It is also possible to introduce the silk first into the solution of Mg(SCN)$_2$ and then to add the solution of NaSCN.

3. Into a mixture of 7 parts by volume of a 57 per cent. solution of NaSCN and 3 parts by volume of a 57 per cent. solution of Ba(SCN)$_2$, 1 part by weight of wastes of natural silk is introduced. After standing for several hours at room temperature the silk has become converted into a paste which is soluble in water. When an acid amide is present in the salt solution, a paste is not formed, but a solution is obtained directly.

4. Into a mixture of 8 parts by volume of a 54 per cent. solution of NaSCN and 2 parts by volume of a 54 per cent. solution of Ba(SCN)$_2$ there is entered 1 part by weight of silk. After about 20 hours' standing, dissolution is complete.

5. 1.5 parts by weight of silk are introduced into a mixture of 8 parts by volume of a 57 per cent solution of NaSCN and 2 parts by volume of a 57 per cent solution of LiSCN. In the course of a day the silk is transformed into a paste which can be dissolved in water either alone or an addition of an acid amide.

6. 2 parts by weight of silk wastes are kneaded into 10 parts by volume of a 51 per cent solution of the double salt Na$_2$Mg(SCN)$_4$. The mass is kept at 25° C. for 15 to 20 hours and thoroughly kneaded from time to time. If, after 15 to 20 hours' standing, dissolution is complete the solution is used, after filtration and dialysis, in known manner for the manufacture of spinning solutions or plastic masses.

7. 1 part by weight of silk wastes is introduced into a solution of 3 parts by volume of a 61 per cent solution of Li Br and 7 parts by volume of a 61 per cent. solution of Ca Br$_2$ to which 10% of formamide have been added. After a 30 to 40 hours' standing at 25° C. the silk has been swollen to a water-soluble paste or has formed a solution.

Our invention is not limited to the foregoing examples or to the specific details given therein, and we contemplate as included within our invention all such modifications and equivalents as fall within the scope of the appended claims.

The term "hydrated salts" used in the specification is intended to include such salts as have strongly hydrated ions, that is to say, ions which are surrounded by a big water envelope.

What we claim is:

1. Process which comprises dissolving fibroin at a temperature not exceeding 30° C. in an aqueous solution containing a major amount of a water-soluble metal thiocyanate, which is itself incapable of dissolving fibroin at a temperature not exceeding 30° C., to which has been added a minor amount of a different water-soluble metal thiocyanate of the class consisting of sodium thiocyanate, lithium thiocyanate, barium thiocyanate, magnesium thiocyanate, zinc thiocyanate and manganese thiocyanate.

2. Process as defined in claim 1, characterized in that the said aqueous solution contains also a water-soluble acid amide.

3. Process which comprises dissolving fibroin, at a temperature not exceeding 30° C., in an aqueous solution of sodium thiocyanate and magnesium thiocyanate, the amount of sodium thiocyanate being at least 30% of the total thiocyanate present.

4. Process as defined in claim 3, in which the solution contains sodium thiocyanate and magnesium thiocyanate in about equal parts by weight.

5. Process of dissolving fibroin which comprises treating fibroin-containing material, in an aqueous solution of sodium thiocyanate saturated at room temperature, and adding thereto an equal volume of a solution of magnesium thiocyanate saturated at room temperature, both steps of the process being carried out at a temperature not exceeding 30° C.

EMIL HUBERT.
WILHELM IRION.
HERBERT MAHN.